United States Patent
Knecht

(10) Patent No.: US 6,268,901 B1
(45) Date of Patent: *Jul. 31, 2001

(54) PHOTOELECTRIC SCANNING DEVICE AND COPIER EQUIPPED THEREWITH

(75) Inventor: Hugo Knecht, Schöfflisdorf (CH)

(73) Assignee: Gretag Imaging AG, Regensdorf (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,462

(22) Filed: Feb. 4, 1999

(30) Foreign Application Priority Data

Feb. 4, 1998 (EP) .................................................. 98101906

(51) Int. Cl.[7] .................................................. G03B 27/52
(52) U.S. Cl. .............................................................. 355/41
(58) Field of Search ................................ 355/18, 55, 72, 355/74, 75, 78, 41

(56) References Cited

U.S. PATENT DOCUMENTS

| | | |
|---|---|---|
| 4,092,067 | 5/1978 | Grossmann . |
| 4,252,436 | 2/1981 | Kogane . |
| 4,647,190 | 3/1987 | Nitsch et al. . |
| 5,184,227 | 2/1993 | Foley . |
| 5,307,114 * | 4/1994 | Nitsch et al. ........................... 355/29 |
| 5,444,514 * | 8/1995 | Negoro et al. ......................... 355/74 |
| 5,767,943 * | 6/1998 | Oberhardt et al. ..................... 355/18 |
| 5,822,045 * | 10/1998 | Erck ...................................... 355/76 |

* cited by examiner

Primary Examiner—Glenn W. Brown
Assistant Examiner—E P LeRoux
(74) Attorney, Agent, or Firm—Burns, Doane, Swecker & Mathis, LLP

(57) ABSTRACT

A scanning device for the point-by-point photoelectric scanning of a photographic film includes a transport arrangement for the transporting of the film along a transport path through a scanning zone, a guide arrangement for the guiding and positioning of the film in the scanning zone, an illuminating arrangement for exposing the film in the scanning zone with measuring light, a photoelectric converter arrangement for converting the measuring light transmitted through the film into corresponding electrical signals, and optical means for guiding the measuring light transmitted through the scanned film onto the photoelectric converter arrangement. The guide arrangement includes a motor-driven, selectively adjustable, moveable platform, positioned in the scanning zone, for the mechanical guiding and positioning of films of at least two different formats. The automatic adjustment of the moveable platform is effected by a sensor for detecting the format of the film to be scanned as well as a control cooperating with the sensor. The scanning device includes a first entry for the in line supply of films to be scanned from an upstream film processor as well as a second entry for the manual feeding of films. A severing arrangement is provided upstream of the first entry which for severing the leader card connected with the film to be scanned. After removal of the leader card, the film is guided into the first entry. The scanning device permits the processing of films of different formats and is well-suited for use in a digital photographic copier.

20 Claims, 10 Drawing Sheets

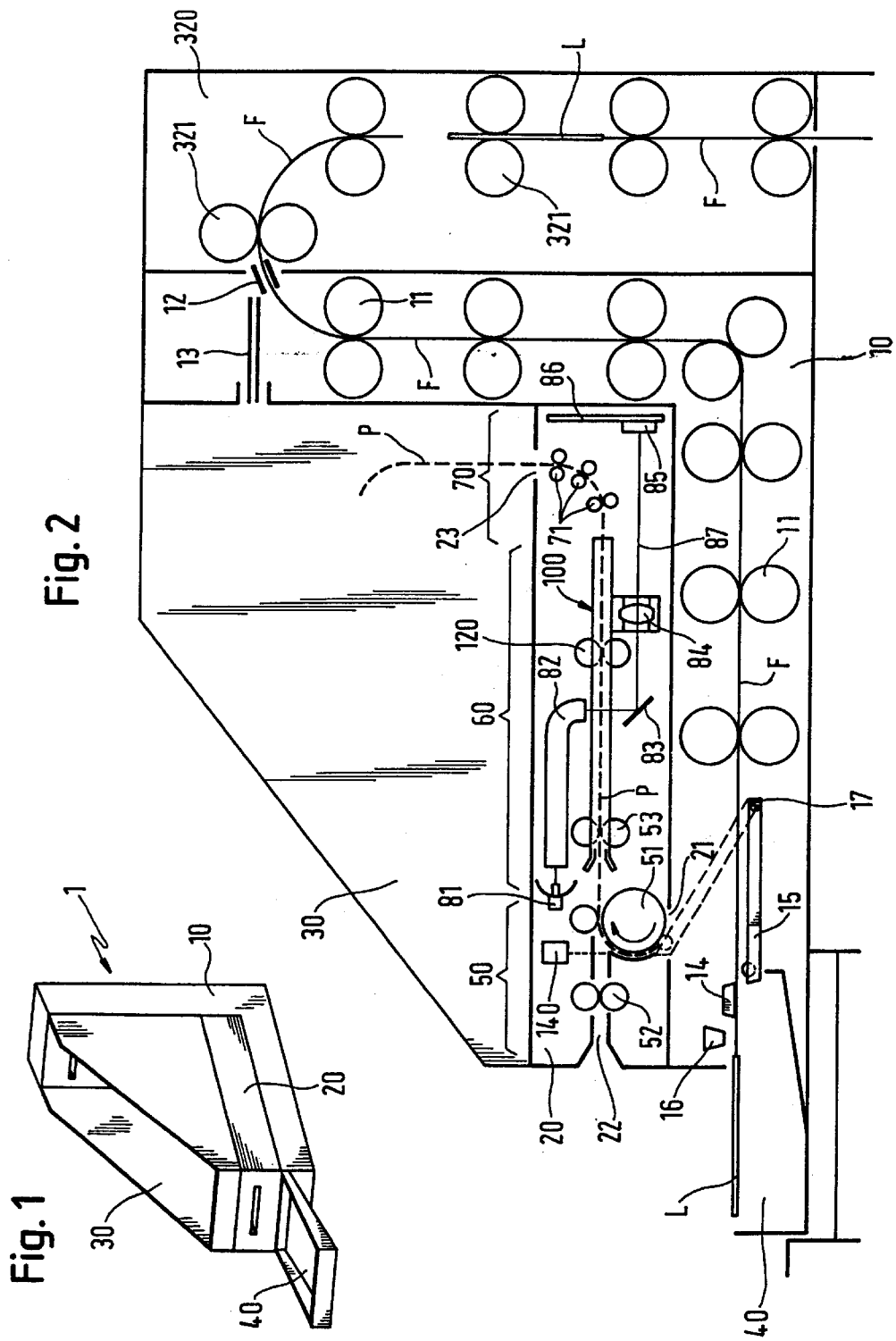

PHOTOELECTRIC SCANNING DEVICE AND COPIER EQUIPPED THEREWITH

FIELD OF THE INVENTION

The invention relates to a scanning device for the essentially point by point photoelectric scanning of a photographic film or a comparable transparent object, as well as a photographic copier equipped with such a scanning device, especially a mini lab adapted for the processing of individual films.

BACKGROUND OF THE INVENTION

Photographic copiers of today are equipped almost exclusively with a so-called scanner which allows the picture by picture photoelectric scanning of the images on a film to be copied with a more or less high resolution, whereby different optical arrangements are used. The digital electric scanning signals produced by the scanner which represent the picture information are in classical optical copiers (printers) analysed for exposure control or correction. In modern, so-called digital copiers, the scanning signals are used after suitable processing for the control of a digital print-producing arrangement, for example, a colour printer or a digital exposure arrangement. A satisfactory picture quality can thereby naturally only be achieved with relatively high resolution scanners and print-producing arrangements.

A high resolution photoelectric scanning also requires a high mechanical precision of the scanning device. In order to avoid positioning errors during the scanning of a film, the film must be very exactly guided at least in the region of the scanning site. This is only possible if the guide elements provided therefor in the scanning device are exactly adjusted to the dimensions (width) of the film. Upon change of the film format, the guide elements must be correspondingly re-adjusted, which means either a separate scanning arrangement must be provided for each film format, or the scanning arrangement must be correspondingly refitted upon each change of the film format. However, this would be very cumbersome, since in the practical application, especially with a mini lab, frequently changing film formats must be expected.

SUMMARY OF THE INVENTION

By means of the present invention, a scanning device of the type known in the art is to be improved such that it can process films of different format without cumbersome refitting.

The solution to the object underlying the invention results from the features of the scanning device in accordance with the invention including a transport arrangement for transporting a film along a transport path, a guide arrangement for mechanical guiding and positioning of the film in a scanning zone, an illuminating arrangement for exposing the film located in the scanning zone to measuring light, a photoelectric converter arrangement for converting the measuring light transmitted by the film into corresponding signals and with optical means for directing the transmitted measuring light to the converter arrangement.

According to a main aspect of the invention, the scanning device is further equipped with a multiple platform for two or more film formats. The moveable platform is thereby provided with two or more arrangements of guide elements, respectively for one film format, which arrangements are selectively inserted into the transport path of the film depending on the film format so that each film format is always respectively exactly guided by the correct guide elements adjusted to its format and positioning errors during scanning are avoided. The ultimate selection of the individual arrangements of guide elements is thereby preferably fully automatic according to a further important aspect of the invention, whereby the film width is determined at a suitable point along the transport path of the film, for example, by way of a light barrier arrangement or another sensor and the moveable platform is correspondingly adjusted by way of a drive. Of course, an adjustment by hand is also possible. Alternatively, several film platforms can be provided for selective insertion into the transport path.

Further beneficial and especially embodiments of the scanning device in accordance with the invention are described in the dependent claims.

The scanning device in accordance with the invention is especially suited for use in a digital photographic copier. A further object of the present invention is therefore to provide a copier equipped with such a scanning device, especially a digital copier, especially a mini lab adapted for the processing of individual films.

BRIEF DESCRIPTION OF THE DRAWINGS

The invention will be further described in the following by way of the drawing. It show:

FIG. 1 a schematic overall view of a typical embodiment of the scanning device in accordance with the invention;

FIGS. 2 to 5 each a schematic longitudinal section through the scanning device in different phases of operation;

DETAILED DESCRIPTION OF THE PREFERRED EMBODIMENT

Figure 3:
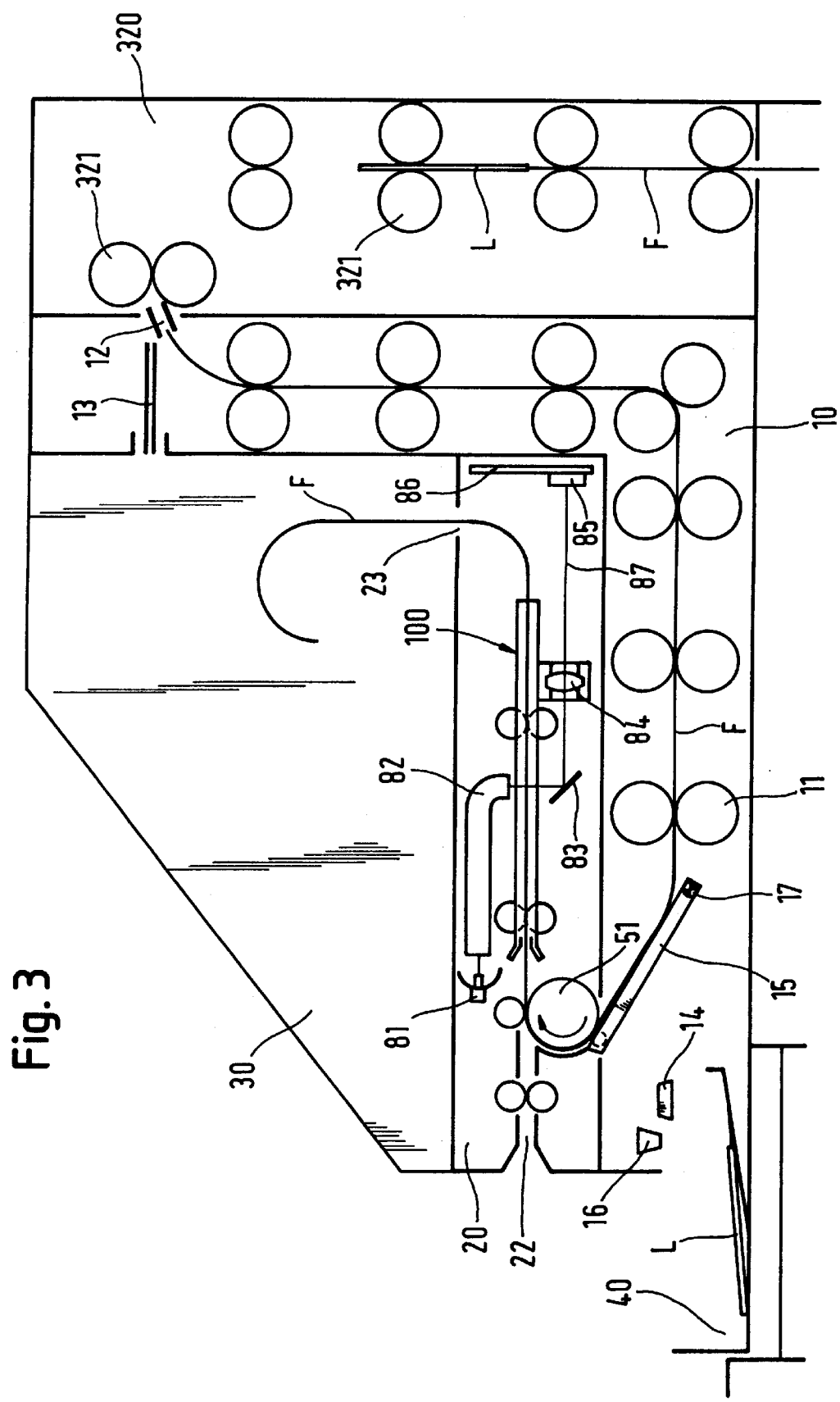

The overall construction of the scanning device in accordance with the invention is apparent from FIG. 1. The scanning device referred to in general by numeral 1 includes a base 10 in the shape of an upright L, a scanner housing 20 positioned on the horizontal leg of the base and enclosing the optical and photoelectrical components of the scanning device, and a film-collecting reservoir 30 for the receiving of (normally) scanned films, which reservoir is positioned on the scanner housing 20. Furthermore, at the forward side of the base 10, a collecting reservoir 40 is provided for so-called leader cards to which undeveloped films are conventionally attached for the transport through a film processor. Transport means described further below are also found in the base 10 for the supply of films to be scanned into the scanner housing 20.

As shown in the sectional illustrations of FIGS. 2 to 5, the scanner housing 20 is provided with a lower first entry 21, a forward second entry 22 and an upper exit 23, and is divided three-dimensionally between the two entries and the exit into three zones, namely a feeding zone 50, a scanning zone 60 and a removal zone 70. A moveable platform for the guiding and positioning of the film to be scanned is positioned in the scanning zone 60, which platform will be described further, is referred to in its entirety by numeral 100 and is provided with motor-driven transport rollers 120. In the feeding zone 50 are positioned motor-driven transport rollers 51 and 52 which guide a film fed in through one of the entries 21 or 22 to the moveable platform 100. Further motor-driven transport rollers 71 are found in the removal zone 70 which take the scanned film from the moveable platform 100 and transport it further through the exit 23 into the film storage container 30. The transport rollers in the feeding zone 50, at the moveable platform 60 and in the removal zone 70 together constitute a transport arrangement which transports the film F to be scanned along a transport path extending through the scanning device and indicated by a broken line P.

Apart from the mentioned mechanical components for the transport and the positioning of the film, the scanner housing 20 includes also the optical and photoelectrical components of the scanning device. In detail, this includes a stationary light source 81, and also a stationary light conducting arrangement 82 formed by a fiber optic fiber bundle, a stationary reflector 83, a number of projecting lenses 84 mounted on the moveable platform 100, and corresponding in number to the intended number of film formats, a stationary photoelectrical converter arrangement 85 and an also stationary electronic 86 for the processing, especially digitalization, of the scanning signals produced in the converter arrangement. The path of the optical scanning beam is indicated by line 87. As directly apparent from the drawing, the light conductor 82 directs the measuring light originating from the light source 81 to a film to be scanned which is positioned on the moveable platform 100 and exposes the film in a small scanning area extending transverse to the direction of transport of the film (measuring line). The measuring light transmitted by the film to be scanned passes through an appropriate opening in the moveable platform 100 onto the reflector 83 and is redirected in a manner to be described into one of the projecting lenses 84. The corresponding projecting lense 84 directs the measuring light to the photoelectric convertor arrangement 85 and projects the region of the film to be scanned which is exposed to the measuring light (the measuring line) onto the converter arrangement 85. The latter is formed, for example, by a photo diode line or a linear arrangement of CCD-elements and converts the measuring light received into corresponding electrical scanning signals, which are processed (digitalized) by the electronics 86 and represent a picture element wise representation of the picture content of the film to be scanned. The local resolution transverse to the film transport direction is determined in generally known manner by the size and spacing of the individual light sensitive elements of the converter arrangement, and the resolution in the film transport direction by the width (thickness) of the measuring line as well as the transport speed of the film. By utilizing colour filters (not shown) or a corresponding colour selective converter arrangement (for example, of the type of a CCD-colour T.V. camera) the transmission or density values in the common colours red, blue, green, can be determined for each scanned picture element. By positioning a dispersive element in the scanning beam 87 and the corresponding construction of the convertor arrangement 85, the spectral transmission and density values can be determined at any number of base points (wave lengths) for each picture element. Principle scanner arrangements for the point-by-point determination of colour density or colour spectra are principally known to the skilled person and, therefore, do not require further description.

The L-shaped base 10 of the scanning device 1 essentially provides an interface to a feed station for films to be scanned, which in practical use in a photographic copier is normally a film processor, wherein the exposed film is developed and dried prior to scanning. FIGS. 2 to 5 schematically illustrate the upper part 320 of such a film processor which is constructed as a dryer. The base 10 includes arrangements for the direct pickup of a film F typically attached to a leader card L, for the severing of the leader card, and for insertion of the film F into the scanner housing 20 through the lower entry 21. These arrangements include essentially transport means in the form of motor-driven transport roller pairs 11, an entry switch 12, a guide bridge 13, not illustrated film guiding elements, and a severing arrangement for leader cards consisting of a stationary knife bar 14 and a motor or electromagetically driven knife 15. The transport roller pairs 11, the input switch 12, the knife 15, the transport roller pairs 51, 52 and 53 in the scanner housing 20 and the transport rollers 120 of the moveable platform 100 as well as the platform itself are controlled by an electronic control S which is only symbolically illustrated in FIG. 6, which is realized in the known manner by an appropriately programmed processor in connection with corresponding interfaces, and which is either independently present in the scanning device 1 or is incorporated into the control of a copier into which the scanning device is inserted.

FIGS. 2 and 3 show how a film F to be scanned is picked up by the upstream drier 320 and automatically guided through the scanning device 1. In the drier 320 and in a wet chemical treatment station 310 of the film processor (FIG. 11), which precedes the drier, the film F is transported attached to a leader card L and by way of transport rollers 321. A leader card L exiting the drier 320 enters into the entry switch 12 together with the film F attached thereto and is guided thereby to the transport roller pairs 12 in the base 10. Those transport the leader card L between the knife bar 14 and the moveable knife 15 into the region of a catch bowl 40 for the leader cards L, whereby a light barrier 16 of the control S signals the entry of the leader card L (FIG. 2). The control S then moves the knife 15 which is pivotable about an axis 17 upward into the position shown in dotted lines, wherein the free knife edge is positioned in immediate vicinity of the lower entry 21 of the scanner housing 20. The film F is thereby cut from the leader card L and the latter falls into the catch bowl 40. The control S then transports the film severed from the leader card by way of the transport roller pairs 12 through the entry 21 into the scanner housing, where it is gripped by the transport roller pair 51 and fed to the moveable platform 100. The knife 15 thereby acts as a guide element for the forward end of the film. From the moveable platform 10, the film F is moved to the film storage container 30 (FIG. 3) through the transport roller pairs 71 and the exit 23.

Figure 4:
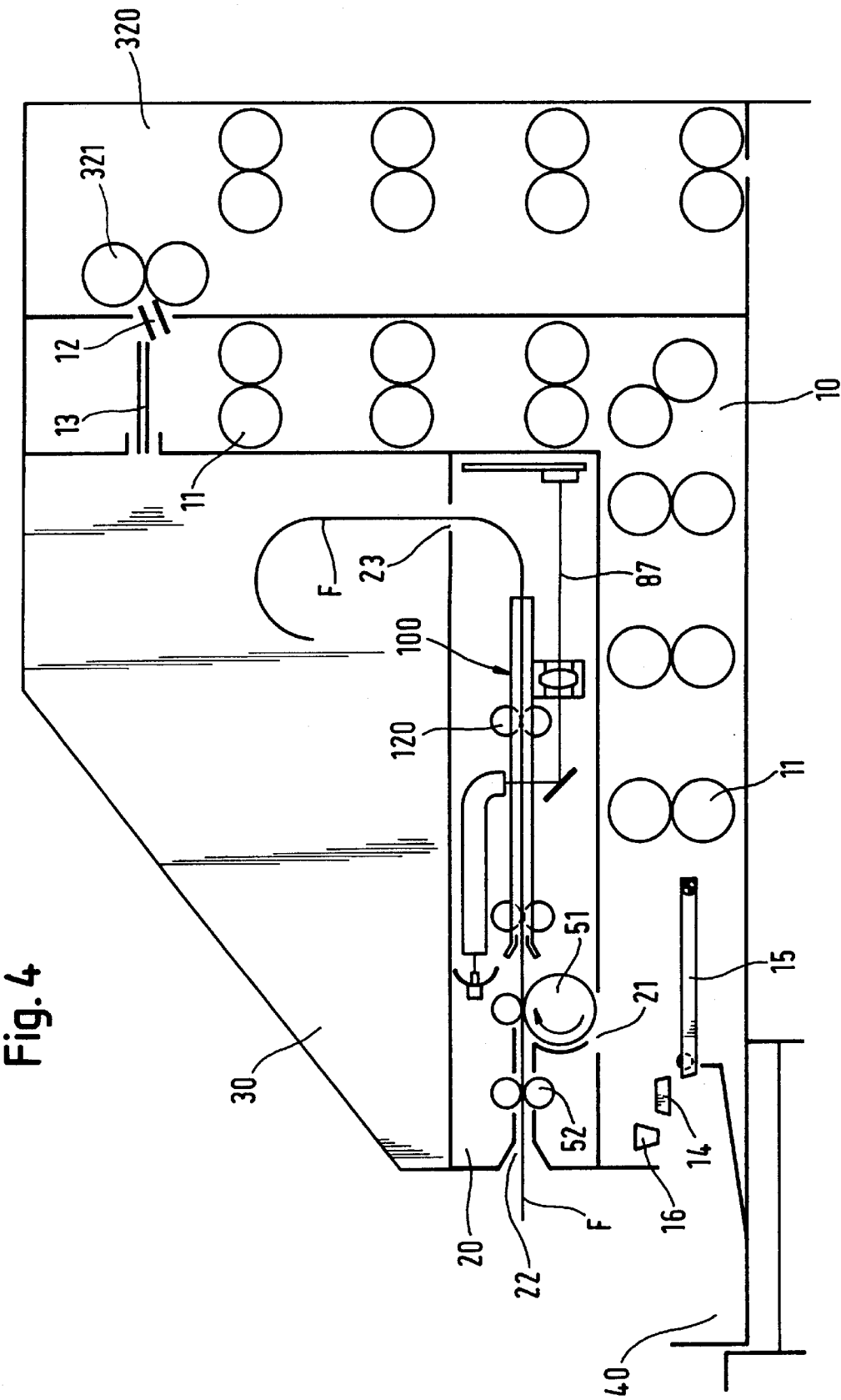

Developed films F (without leader card) can also be manually fed into the scanning device 1 through the forward entry 22 of the scanner housing 20 (FIG. 4). The inserted film F is thereby gripped by the transport roller pair 52 situated behind the entry and transported to the transport roller pair 51 from where the further transport is effected in the same way as described in connection with FIGS. 2 and 3.

Figure 5:
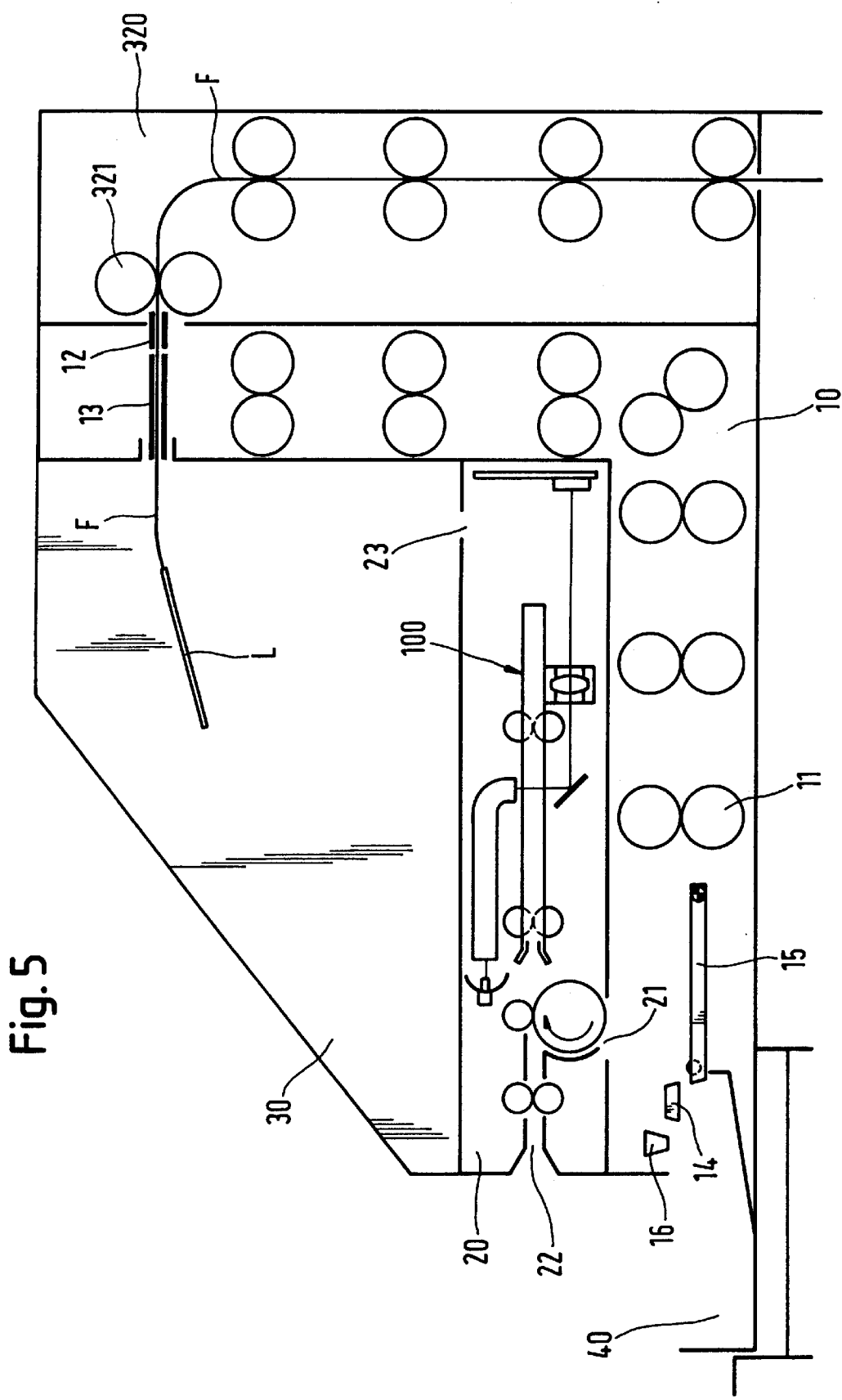
Figure 6:
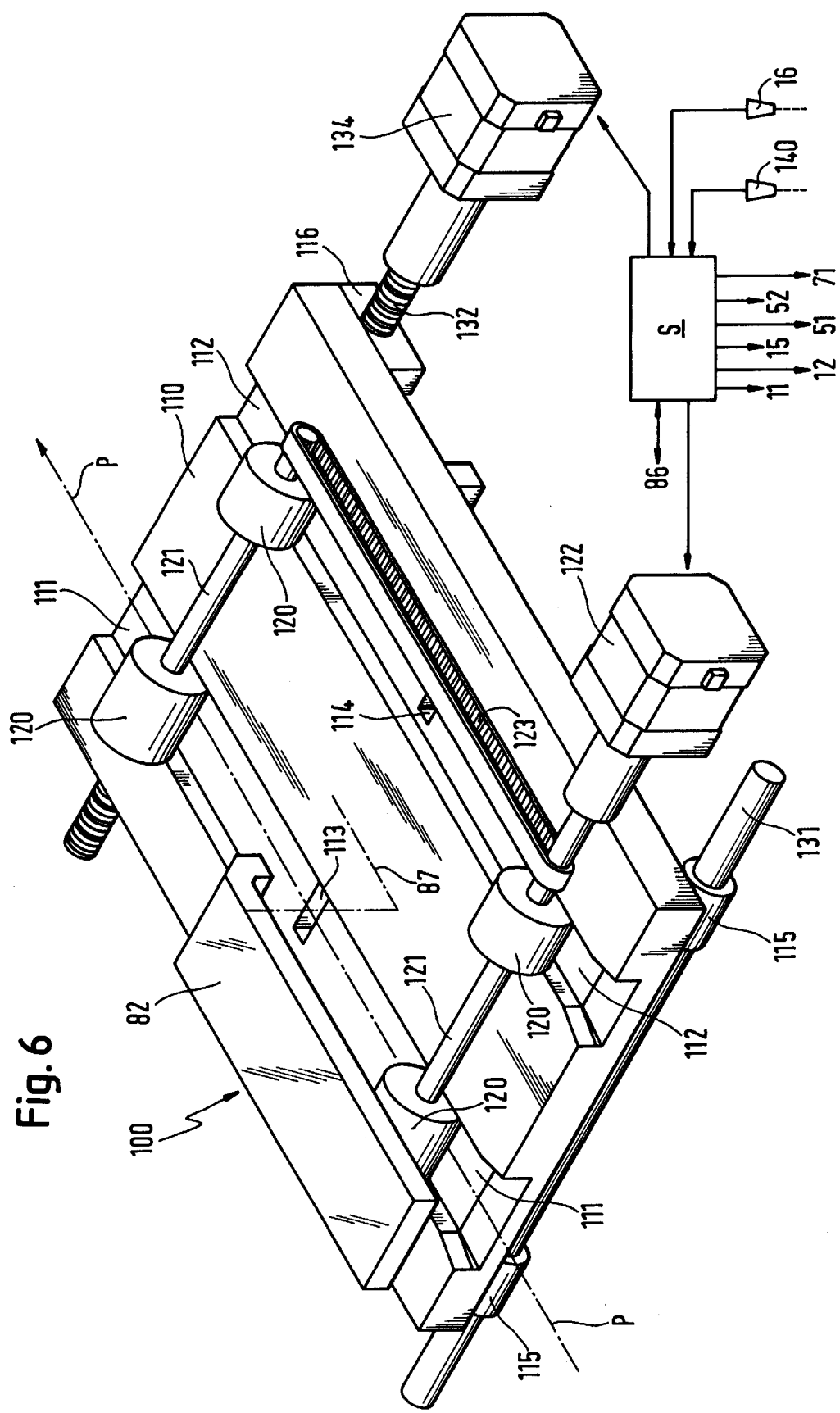
FIG. 6 an oblique view of the moveable platform of the scanning device.
Figure 7:
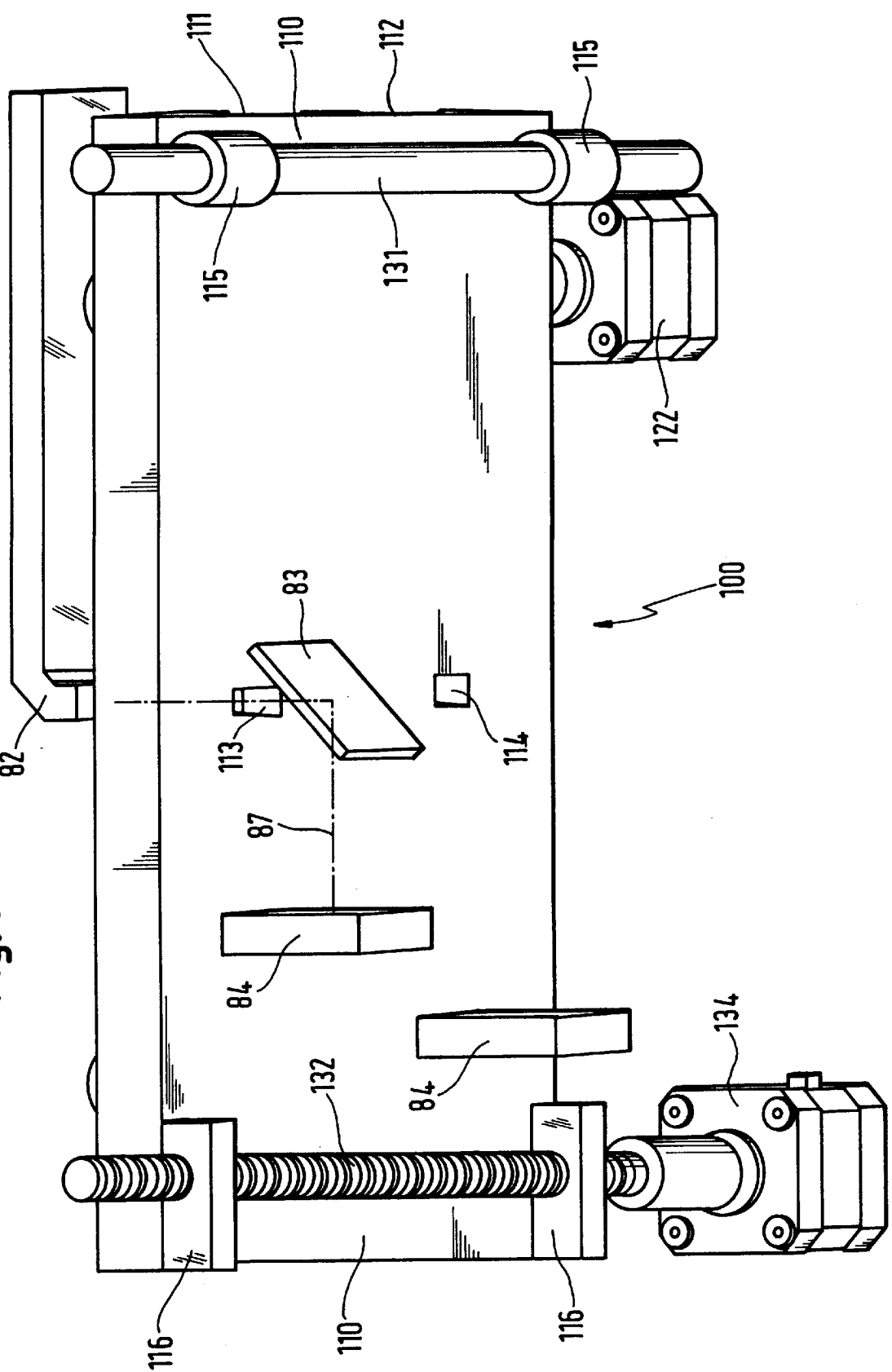
FIGS. 7 to 9 a bottom plan view, a side elevational view and a front elevational view of the moveable platform according to FIG. 6.
Figure 8:
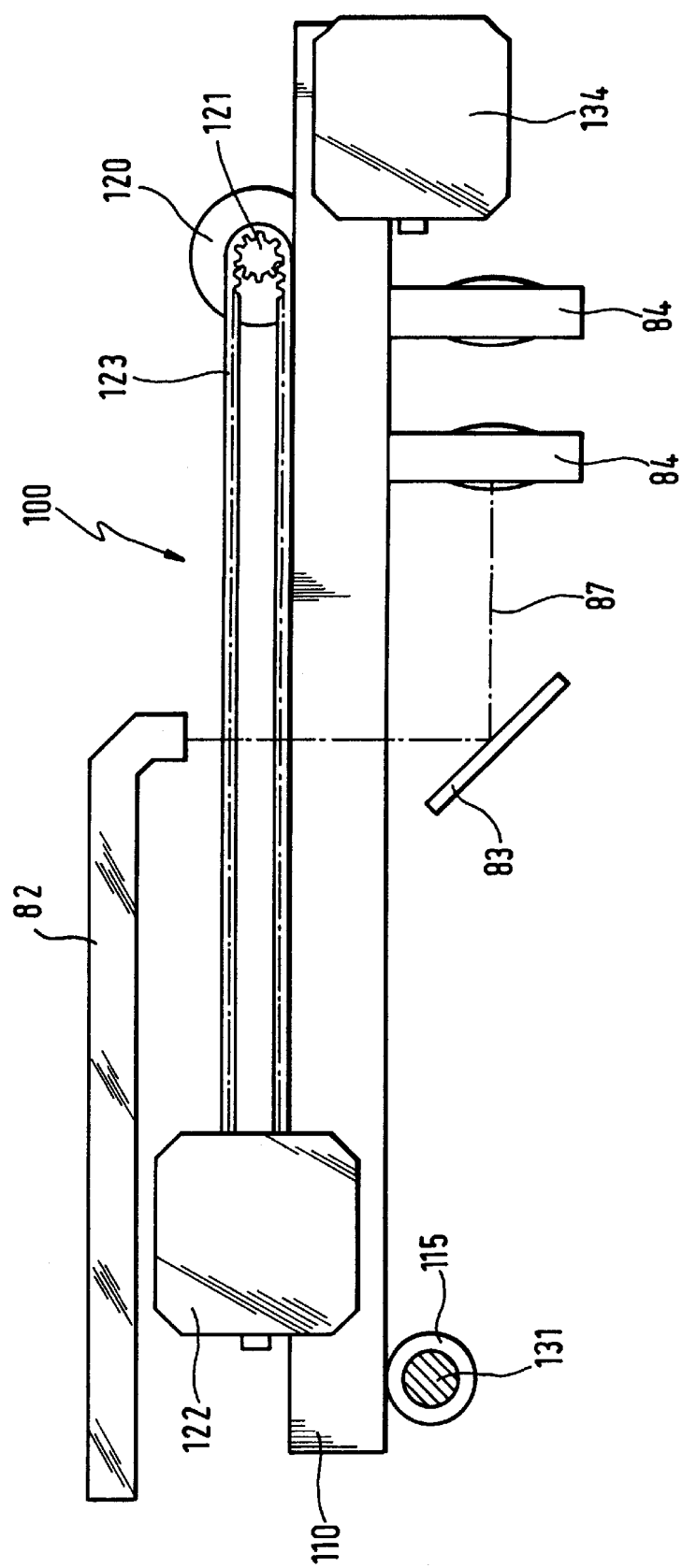
Figure 9:
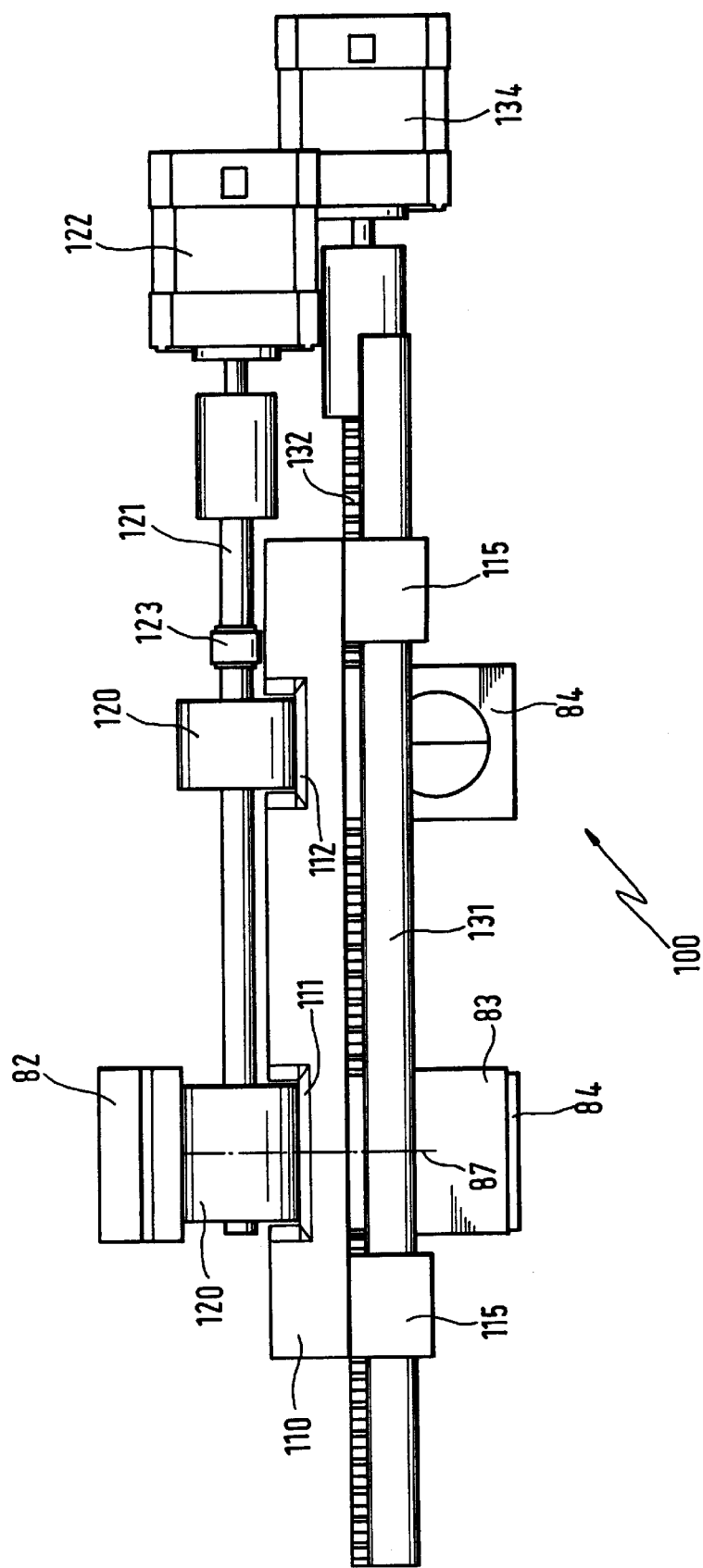

FIG. 5 further illustrates how a film F exiting the dryer 320 can be directly guided into the film storage container 30 without scanning. For this purpose, the entry switch 12 is brought into the illustrated position wherein the leader card L with the film F attached thereto is steered into the storage container 30 by way of the guide bridge 13.

The construction and function of the moveable platform 100 is further described in the following by reference to FIGS. 6 to 9.

The moveable platform 100 includes an essentially planar base plate 110 into the upper side of which are cut two parallel groove-shaped guide channels 111 and 112. They function as guide elements for the films that have to be scanned and are exactly adjusted in width to two different film formats (film widths), for example, 135-films and APS-films. At about the center of each guide channel 111 and 112, the base plate 110 is respectively perforated by a small rectangular scanning window 113 or 114 which extends transverse to the longitudinal direction of the respective guide channel. Four transport rollers 120 are mounted in pairs on the base plate 110 and on two shafts 121 by bearings which are not illustrated and are rotatably driven by way of a motor 122 also mounted on the base plate 110 (in a manner not illustrated) and through a toothed belt 123 which couples the two shafts. Respectively, two transport rollers 120 reach into one of the two guide channels 111 and 112 for the transporting of the film guided therein.

The base plate 110 is provided at its underside with two slide bearings 115 and two spindle bearings 116. The two slide bearings 115 incorporate a slide rod 131 which is rigidly mounted in the scanner housing 20. A drive spindle 132 is rotatably supported in the two spindle bearings 116, which spindle is rotatably driven by a drive motor 134 also rigidly mounted in the scanner housing 20. The slide rod 131 and the drive spindle 132 extend at a right angle transverse to the longitudinal direction of the two guide channels 111 and 112. The base plate 110 can be adjusted by way of the drive spindle 132 driven by the motor 134 and transverse to the longitudinal direction of the two guide channels 111 and 112 and, therefore, transverse to the transport direction of the films F guided therein, whereby it slides with its slide bearings 115 on the slide rod 131. By way of this transverse adjustment of the base plate 110, the respective guide channel 111 of 112 which matches the format of the film to be scanned can be brought into the transport path of the film so that the film during scanning is exactly guided and incorrect positioning during scanning is avoided. The adjustment of the moveable platform 100 or its base plate 110 is preferably automatic, but can of course also be carried out manually. The automatic adjustment is effected by way of the control S which, cooperates therefor with a film width sensor 140, for example, a light barrier, which is positioned at a suitable location in the transport path P of the film F. For example, the sensor can be positioned in the region of the transport roller pair 51 as shown in FIG. 2, which has the advantage that films can be detected which are guided either through the entry 21 or the manual entry 22.

The arrangement of the optical components of the scanning device is also well recognizable from FIGS. 6 to 9. The stationary light conducting arrangement 82 is positioned above the transport path P of the films so that its output end is positioned exactly above the scanning window of the respectively active guide channel inserted into the transport path and so that the film to be scanned is exactly exposed to measuring light in the area of the scanning window. Accordingly, the likewise stationary reflector 83 is positioned exactly below the output end of the light conducting arrangement 82 and on the opposite side of the base plate 110. The projecting optics 84 are mounted at the underside of the base plate 110 and accordingly are moveable together therewith. Each guide channel 111 or 112 is provided with its own projecting optics 84, whereby only the projecting optics associated with the respectively active guide channel is positioned in the scanning beam. The projecting optics are so-adjusted with respect to magnification and position that they correctly project the measuring line of the film to be scanned subjected to the measuring light onto the photoelectric converter arrangement 85 rigidly mounted in the scanner housing.

It is understood that the moveable platform 100 is not limited to two different film formats, but can also be constructed for several film formats. It would be merely necessary to provide several guide channels or corresponding guide elements which can be selectively positioned in the transport path of the film. Alternative to a transversely adjustable base plate, the moveable platform can also be provided with several stacked base plates which respectively are brought into the film transport path by corresponding adjustment perpendicular to the plane of the plate.

Figure 10:
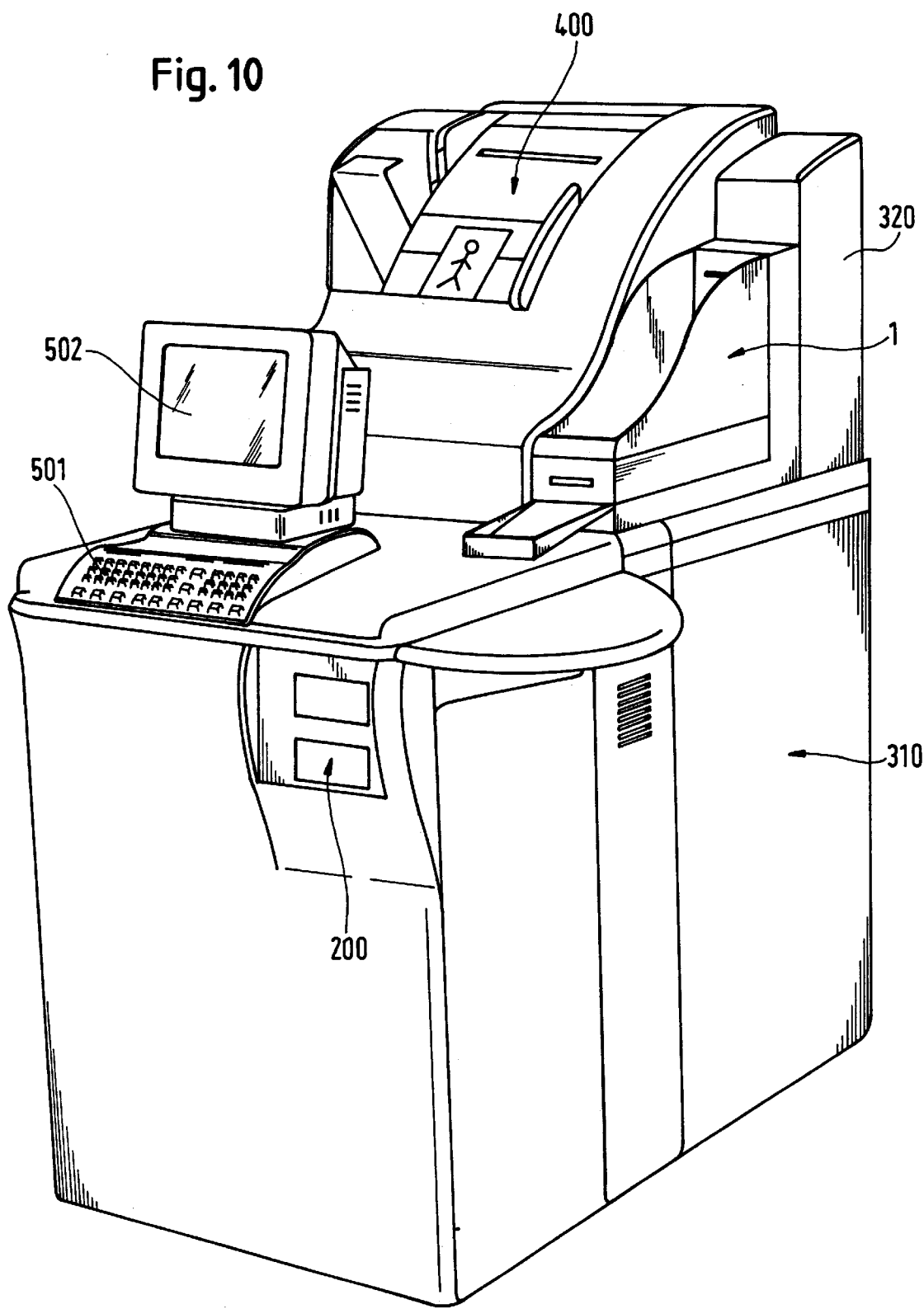
FIG. 10 a schematic overall view of a copier in accordance with the invention in the form of a mini lab.
Figure 11:
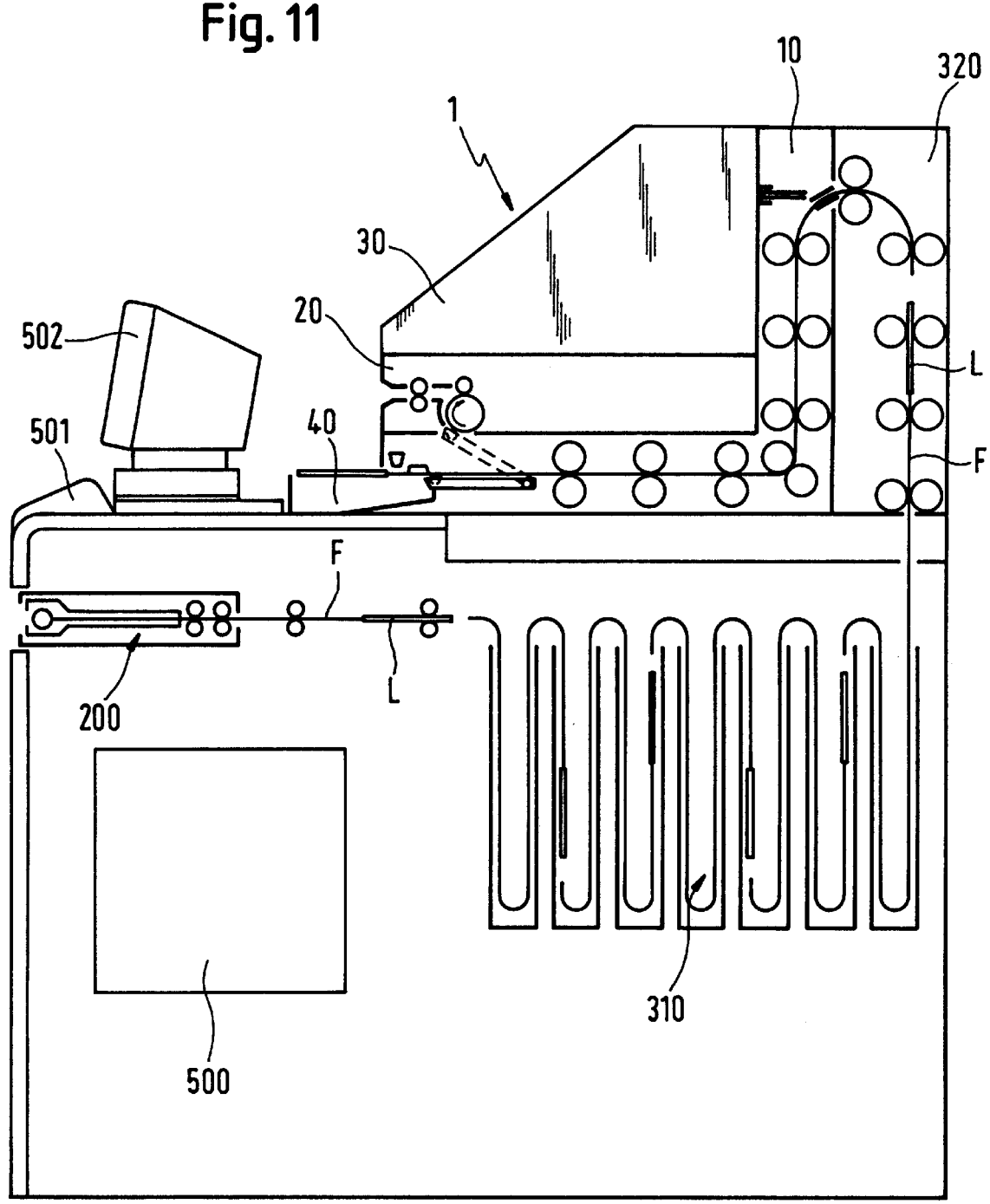
FIG. 11 a schematic section through the copier of FIG. 10.

FIGS. 10 and 11 show a photographic copier in the form of a digital mini lab equipped with a scanning device 1 in accordance with the invention. The mini lab which in its exterior appearance essentially corresponds to known mini labs includes, partly inside its housing, partly outside or on its housing, a loading station 200 for exposed films to be copied, a film processor consisting of a wet chemical part 310 and a dryer 320, the scanning device 1 for the developed films, a printproducing arrangement 400, for example, in the form of a digital colour printer or a digital exposure arrangement (for example, a laser exposure arrangement or a CRT exposure arrangement) and a digital control 500 with a keyboard 501 and a monitor 502 as user interface. The scanning device 1 is connected with the output of the dryer 320 and receives the developed films F directly (in line) therefrom. The control 500 also controls the scanning device 1 and processes the scanning signals produced by the scanning device 1 in such a way for the digital pictureproducing arrangement 400 that the latter can produce physical pictures therefrom, which correspond to the desired copies of the images found on the film. A picture manipulation can be carried out according to known criteria and, if desired, also through manual intervention through a keyboard. If desired, the copies can also be provided with additional information or image and text elements. Furthermore, the production of so-called index prints is also possible.

What is claimed is:

1. Scanning device for point-by-point photoelectric measuring of a transparent object, the device comprising:

a transport arrangement for transporting the transparent object along a transport path through a scanning zone;

a guide arrangement for guiding and positioning the transparent object in the scanning zone;

an illuminating arrangement for exposing the transparent object located in the scanning zone with measuring light;

and a photoelectric converter arrangement for converting the measuring light transmitted by the transparent object into corresponding electric signals and having optical means for directing the measuring light transmitted by the transparent object to the photoelectric converter arrangement, wherein;

the guide arrangement includes a selectively adjustable moveable platform which is adapted for guiding and positioning of said transparent object, said transparent object being any one of at least two different formats; and the moveable platform comprises at least two parallel guide elements adapted for said at least two different formats, said guide elements being selectively moveable into the transport path of the transparent object, the optical means including at least two projecting optics each associated with one of the guide elements.

2. Device according to claim 1, wherein the movable platform is driven by an electric motor.

3. Device according to claim 1, wherein the moveable platform includes a base plate provided with at least two guide channels, said base plate being moveable transverse to the transport path of the film, whereby the guide channels are selectively moveable into the transport path of the transparent object by way of a drive motor.

4. Device according to claim 1, further comprising a sensor for detecting the format of the transparent object to be scanned and a control cooperating therewith for automatic adjustment of the moveable platform depending on the format of the transparent object detected by the sensor.

5. Device according to claim 3, wherein the illumination arrangement and the optical means are positioned on opposite sides of the base plate and a scanning window is provided in each guide channel for the passage of measuring light transmitted through the transparent object.

6. Device according to claim 5, wherein the illuminating arrangement includes a stationary light source and a stationary light conducting arrangement, the light conducting arrangement exposing the transparent object to be scanned with measuring light in a region of the scanning window of the guide channel that is positioned in the transport path.

7. Device according to claim 5, wherein the photoelectrical converter arrangement is stationary and the optical means is mounted to the base plate for movement therewith, said projecting optics project a region of the scanned transparent object exposed to the measuring light onto the photoelectric converter arrangement.

8. Device according to claim 7, wherein the optical means include a stationary reflector for redirecting the measuring light transmitted by the transparent object respectively into a projecting optic associated with the guide channel that is positioned in the transport path.

9. Device according to claim 1, further comprising a first entry and transport means associated therewith for receiving a transparent object to be scanned from a preceding feeding station and guiding the transparent object into the first entry.

10. Device according to claim 9, further comprising a second entry for the manual feeding of a transparent object to be scanned.

11. Device according to claim 9, further comprising a severing arrangement positioned before the first entry for severing a leader card connected with transparent object to be scanned, whereby the transport means feed the transparent object into the first entry after removal of the leader card.

12. A photographic copier, adapted for the processing of individual films, comprising:
 a film processor for the development and drying of an exposed photographic film;
 a reproducing means for producing on a carrier material copies of images found on the film; and
 a scanning device for point-by-point photoelectric measuring of the film, the scanning device comprising:
  a transport arrangement for transporting the film along a transport path through a scanning zone;
  a guide arrangement comprising a selectively adjustable moveable platform adapted for the guiding and positioning of the film, wherein said film is any one of at least two different formats;
  an illuminating arrangement for exposing the film located in the scanning zone with measuring light;
  a photoelectric converter arrangement for converting the measuring light transmitted by the film into corresponding electric signals; and
  an optical means for directing the measuring light transmitted by the film to the photoelectric converter arrangement, wherein the selectively adjustable moveable platform comprises at least two guide channels and the optical means comprise at least two projecting optics each associated with one of the guide channels.

13. Copier according to claim 12, wherein the scanning device includes a first entry and transport means associated therewith for receiving a film to be scanned from a preceding feeding station and guiding the film into the first entry, and a severing arrangement positioned before the first entry for severing a leader card connected with the film, whereby the transport means feed the film into the first entry after removal of the leader card, the film being automatically transported from the film processor through the severing arrangement into the scanning device.

14. Copier according to claim 12, wherein the means for reproducing copies is a digital picture-producing arrangement, controlled by scanning signals representing the image content of the film and produced by the scanning device and processed.

15. Copier according to claim 14, wherein the digital picture producing arrangement is one of a digital exposure arrangement and a colour printer.

16. The scanning device of claim 1 wherein the transparent object is photographic film.

17. Scanning device for point-by-point photoelectric measuring of a transparent object, the device comprising:
 a transport arrangement for transporting the transparent object along a transport path through a scanning zone;
 a guide arrangement for guiding and positioning the transparent object in the scanning zone;
 an illuminating arrangement for exposing the transparent object located in the scanning zone with measuring light;
 and a photoelectric converter arrangement for converting the measuring light transmitted by the transparent object into corresponding electric signals and having optical means for directing the measuring light transmitted by the transparent object to the photoelectric converter arrangement, wherein:
  the guide arrangement includes a selectively adjustable moveable platform which is adapted for guiding and positioning of said transparent object, said transparent object being any one of at least two different formats;
  the moveable platform comprises at least two parallel guide elements adapted for said at least two different formats, said guide elements being selectively moveable into the transport path of the transparent object;
  the illuminating arrangement and the optical means are positioned on opposite sides of the moveable platform and a scanning window is provided in each guide element for the passage of measuring light transmitted through the transparent object; and
  the photoelectrical converter arrangement is stationary and the optical means include at least two projecting optics each associated with one of the guide elements and mounted to the movable platform for movement therewith, said projecting optics project a region of the scanned transparent object exposed to the measuring light onto the photoelectric converter arrangement.

18. A device for photoelectric scanning, comprising:
 a transport arrangement for transporting an object along a transport path through a scanning zone;
 a first guide adapted for a first object format;

a second guide parallel to the first guide and adapted for a second object format different from the first object format, the first and second guides for guiding and positioning an object in the scanning zone and selectively movable into the transport path;

an illuminating arrangement for exposing an object located in the scanning zone with measuring light;

a photoelectric converter arrangement for converting the measuring light transmitted through an object into corresponding electric signals; and a first projecting optics and a second projecting optics for directing the measuring light transmitted through the object to the photoelectric converter arrangement, wherein the measuring light is directed by the first projecting optics when the first guide is moved into the transport path and by the second projecting optics when the second guide is moved into the transport path.

19. The device of claim 18, wherein the first and second projecting optics are of different magnifications.

20. The device of claim 19, wherein the first and second projecting optics are positioned differently from each other relative to the photoelectric converter arrangement.

* * * * *